(12) United States Patent
Won et al.

(10) Patent No.: US 11,199,277 B2
(45) Date of Patent: Dec. 14, 2021

(54) NON-WELDED TYPE BRANCH PIPING REINFORCEMENT APPARATUS

(71) Applicant: KEPCO ENGINEERING & CONSTRUCTION COMPANY, INC., Gimcheon-si (KR)

(72) Inventors: Youn Ho Won, Seongnam-si (KR); Soo Kyum Kim, Gimcheon-si (KR); Chang Bin Jeong, Gimcheon-si (KR); Dong Geon Lee, Gimcheon-si (KR)

(73) Assignee: KEPCO ENGINEERING & CONSTRUCTION COMPANY, INC., Gyeongsangbuk-Do (KR)

(*) Notice: Subject to any disclaimer, the term of this patent is extended or adjusted under 35 U.S.C. 154(b) by 225 days.

(21) Appl. No.: 16/661,137

(22) Filed: Oct. 23, 2019

(65) Prior Publication Data
US 2020/0132226 A1 Apr. 30, 2020

(30) Foreign Application Priority Data

Oct. 24, 2018 (KR) .................. 10-2018-0127703

(51) Int. Cl.
*F16L 55/10* (2006.01)
*F16L 3/08* (2006.01)
(Continued)

(52) U.S. Cl.
CPC ............. *F16L 3/085* (2013.01); *F16L 3/1066* (2013.01); *F16L 21/04* (2013.01); *F16L 55/17* (2013.01);
(Continued)

(58) Field of Classification Search
CPC ......... F16L 3/085; F16L 3/1066; F16L 21/04; F16L 55/17; F16L 57/005; F16L 57/02; F16L 41/02; F16L 55/168
(Continued)

(56) References Cited

U.S. PATENT DOCUMENTS

| 1,701,691 | A | * | 2/1929 | Mueller | .................. | F16L 41/06 |
| | | | | | | 29/890.12 |
| 1,895,827 | A | * | 1/1933 | Van Hecke | ............. | F16L 41/16 |
| | | | | | | 285/143.1 |

(Continued)

FOREIGN PATENT DOCUMENTS

EP  2 792 881  10/2014
WO  WO-2008/062212  5/2008
(Continued)

OTHER PUBLICATIONS

Extended European Search Report (Application No. 19204930.2) dated Apr. 9, 2020.

*Primary Examiner* — James F Hook
(74) *Attorney, Agent, or Firm* — Nixon Peabody LLP; Jeffrey L. Costellia

(57) ABSTRACT

A non-welded type branch piping reinforcement apparatus capable of preventing damage to a branch pipe system by increasing the strength of the branch pipe system by covering and protecting the branch pipe system connected to a header pipe, by a joint clamp, a connection pipe clamp, and a valve clamp includes: a joint clamp arranged to cover the branch pipe joint and the connection pipe and having an arc-shaped cross section; a connection pipe clamp arranged to cover the connection pipe and having an arc-shaped cross section; and a valve clamp arranged to cover the connection pipe and the valve and having an arc-shaped cross section, wherein one end of the connection pipe clamp is connected to the joint clamp and the other end of the connection pipe clamp is connected to the valve clamp.

7 Claims, 10 Drawing Sheets

(51) Int. Cl.
*F16L 3/10* (2006.01)
*F16L 55/17* (2006.01)
*F16L 21/04* (2006.01)
*F16L 57/02* (2006.01)
*F16L 57/00* (2006.01)
*F16L 41/02* (2006.01)
*F16L 55/168* (2006.01)

(52) U.S. Cl.
CPC ............. *F16L 57/005* (2013.01); *F16L 57/02* (2013.01); *F16L 41/02* (2013.01); *F16L 55/168* (2013.01)

(58) Field of Classification Search
USPC .............................................. 138/99, 92, 94
See application file for complete search history.

(56) References Cited

U.S. PATENT DOCUMENTS

| | | | |
|---|---|---|---|
| 2,009,744 A | | 7/1935 | Pfefferle et al. |
| 2,194,263 A | * | 3/1940 | Allen .................... F16K 27/044 251/146 |
| 2,621,679 A | * | 12/1952 | Tuttle .................... G01M 3/022 138/90 |
| 2,778,662 A | * | 1/1957 | Smith .................... F16L 41/06 285/343 |
| 3,995,655 A | * | 12/1976 | Sands .................... F16L 41/06 137/318 |
| 4,127,141 A | * | 11/1978 | Ledonne ............... F16L 55/124 137/15.15 |
| 4,809,735 A | * | 3/1989 | Volgstadt .............. F16L 47/345 137/318 |
| 2009/0166573 A1 | * | 7/2009 | Sakai ...................... F16L 41/02 251/326 |
| 2016/0047509 A1 | * | 2/2016 | Long ....................... F16L 55/18 138/99 |

FOREIGN PATENT DOCUMENTS

| | | |
|---|---|---|
| WO | WO-2010/136801 | 12/2010 |
| WO | WO-2015/002339 | 1/2015 |
| WO | WO-2017/137856 | 8/2017 |

\* cited by examiner

NON-WELDED TYPE BRANCH PIPING REINFORCEMENT APPARATUS

CROSS-REFERENCE TO RELATED APPLICATION

This application claims the benefit of Korean Patent Application No. 10-2018-0127703, filed on Oct. 24, 2018, in the Korean Intellectual Property Office, the disclosure of which is incorporated herein in its entirety by reference.

BACKGROUND

1. Field

One or more embodiments relate to a non-welded type branch piping (pipe system) reinforcement apparatus, and more particularly, to a non-welded type branch piping reinforcement apparatus that may prevent damage to a branch pipe system by increasing the strength of the branch pipe system by covering and protecting the branch pipe system connected to a header pipe, by a joint clamp, a connection pipe clamp, and a valve clamp.

2. Description of Related Art

Among the pipe systems used in a power plant, there are branch pipe systems of various sizes and shapes branching from header pipes. Among these branch pipe systems, there is a small-diameter tap branch pipe system, and a tap branch pipe system is used for drainage and vent of a header pipe or for installation of a measuring instrument and generally has an "L" shape or a cantilever shape having a free end as one end thereof.

Such a branch pipe system is connected to a header pipe in the order of a branch pipe joint, a connection pipe, a shutoff valve, a connection pipe, and a cap or tubing. However, such a branch pipe system has the following limitations.

Because the branch pipe system generally has a cantilever shape or an "L" shape and a valve of the branch pipe system acts as a concentrated mass, when a vibration occurs therein, the branch pipe system is easily affected thereby. Particularly, due to such a structural factor, when the natural frequency of the branch pipe system matches the frequency of the header pipe, the branch pipe system resonates and thus the vibration of the branch pipe system is greatly amplified even when the vibration of the header pipe is small.

The vibration of the branch pipe system may occur frequently during normal operation or during commissioning and may occur mainly due to a resonation caused by the vibration of the header pipe, a flow-induced vibration caused by a vortex occurring at an inlet of the branch pipe system, or the like. Such a vibration of the branch pipe system may cause damage to the branch pipe system, and particularly when a welding portion of the branch pipe system has a defect, there is a very high possibility that a crack will occur at the welding portion due to the vibration of the branch pipe system.

In order to repair the damage to the branch pipe system caused by the vibration of the branch pipe system, in some cases, the output of the power plant has to be reduced or the operation thereof has to be stopped, thus hindering the normal operation and safety of the power plant.

Also, in order to prevent the damage caused by the vibration of the branch pipe system, it is necessary to accurately predict a vibration load during the operation of the header pipe and the branch pipe system; however, it is difficult to accurately predict such a vibration load in the design stage thereof. Thus, methods of the related art have been used to verify the soundness of the branch pipe system by observing and evaluating the influence of the vibration during the commissioning, perform a corrective action in the event of a high vibration, or prevent damage to the branch pipe system without accurately predicting the vibration load of the branch pipe system.

In the related art, in order to reduce the vibration of the branch pipe system, an integrated support is also used to connect the branch pipe system to the header pipe; however, the integrated support may not be installed due to constraints of installation space and a lot of additional effort may be required to confirm the soundness of the branch pipe system and the support components.

Also, in the related art, a method of increasing the fatigue resistance of a socket welding portion by reinforcing the socket welding portion of the branch pipe system is also used; however, this method has almost no effect of fundamentally reducing the vibration, fails to prevent a discontinuous deformation occurring at the socket welding portion of the connection pipe between the branch pipe joint and the valve, and fails to reduce a bending stress caused by the vibration.

Also, in the related art, a method of changing the socket welding portion of the branch pipe system into a butt welding type is also used; however, this method may increase the fatigue resistance of the welding portion in the event of a vibration in the branch pipe system but has almost no effect of fundamentally reducing the vibration, fails to prevent a discontinuous deformation occurring at the diameter change point of the branch pipe joint, the connection pipe and the valve, and fails to reduce a bending stress caused by the vibration.

SUMMARY

One or more embodiments include a non-welded type branch piping reinforcement apparatus that may prevent damage to a branch pipe system by increasing the strength of the branch pipe system by covering and protecting the branch pipe system connected to a header pipe, by a joint clamp, a connection pipe clamp, and a valve clamp.

Additional aspects will be set forth in part in the description which follows and, in part, will be apparent from the description, or may be learned by practice of the presented embodiments of the disclosure.

According to one or more embodiments, a non-welded type branch piping reinforcement apparatus includes: a joint clamp arranged to cover the branch pipe joint and the connection pipe and having an arc-shaped cross section; a connection pipe clamp arranged to cover the connection pipe and having an arc-shaped cross section; and a valve clamp arranged to cover the connection pipe and the valve and having an arc-shaped cross section, wherein one end of the connection pipe clamp is connected to the joint clamp and the other end of the connection pipe clamp is connected to the valve clamp.

In the non-welded type branch piping reinforcement apparatus, the joint clamp may be provided in plurality to cover the branch pipe joint and the connection pipe, the connection pipe clamp may be provided in plurality to cover the connection pipe, and the valve clamp may be provided in plurality to cover the connection pipe and the valve, and the non-welded type branch piping reinforcement apparatus may further include: a first fastening portion extending in a plate shape along the joint clamp while protruding from both side ends of an arc-shape of the joint clamp and provided with a first fastening hole into which a first fastening bolt is to be fitted; a second fastening portion extending in a plate shape along the connection pipe clamp while protruding from both side ends of an arc-shape of the connection pipe clamp and provided with a second fastening hole into which a second fastening bolt is to be fitted; and a third fastening portion extending in a plate shape along the valve clamp while protruding from both side ends of an arc-shape of the valve clamp and provided with a third fastening hole into which a third fastening bolt is to be fitted.

In the non-welded type branch piping reinforcement apparatus, one end and the other end of the connection pipe clamp may be provided with a plate-shaped second connection plate having a second connection hole formed therein while extending in a direction across an extension direction of the connection pipe, the other end of the joint clamp may be provided with a plate-shaped first connection plate having a first connection hole formed therein while extending in a direction across an extension direction of the connection pipe, and one end of the valve clamp may be provided with a plate-shaped third connection plate having a third connection hole formed therein while extending in a direction across an extension direction of the connection pipe.

The non-welded type branch piping reinforcement apparatus may further include: a plate-shaped first stress reinforcement plate protruding from a side surface of the joint clamp and extending along the joint clamp; a plate-shaped second stress reinforcement plate protruding from a side surface of the connection pipe clamp and extending along the connection pipe clamp; and a plate-shaped third stress reinforcement plate protruding from a side surface of the valve clamp and extending along the valve clamp.

In the non-welded type branch piping reinforcement apparatus, one end of the first stress reinforcement plate may contact the header pipe while having a curved surface formed corresponding to the curvature of the header pipe, and one end of the first fastening portion may contact the header pipe while having a curved surface formed corresponding to the curvature of the header pipe.

In the non-welded type branch piping reinforcement apparatus, a plurality of bolt holes into which a fixing bolt is to be fastened may be formed at a side surface of the valve clamp along a circumference of the valve clamp, and the fixing bolt may be fastened into the bolt hole to contact a surface of the valve, wherein a friction filler may be fitted between the fixing bolt and the surface of the valve.

The non-welded type branch piping reinforcement apparatus may further include: a first spacer formed to have a larger diameter than the first fastening hole and fitted between a plurality of first fastening portions as the first fastening portion; a second spacer formed to have a larger diameter than the second fastening hole and fitted between a plurality of second fastening portions as the second fastening portion; and a third spacer formed to have a larger diameter than the third fastening hole and fitted between a plurality of third fastening portions as the third fastening portion.

The non-welded type branch piping reinforcement apparatus may further include a stiffener formed in a plate shape, coupled to the first stress reinforcement plate, and provided with an insertion hole into which an adjustment bolt is to be inserted, wherein the first stress reinforcement plate may be provided with a groove that is larger than a diameter of the adjustment bolt and extends in a transverse direction and one end of the stiffener may contact the header pipe while having a curved surface formed corresponding to the curvature of the header pipe.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
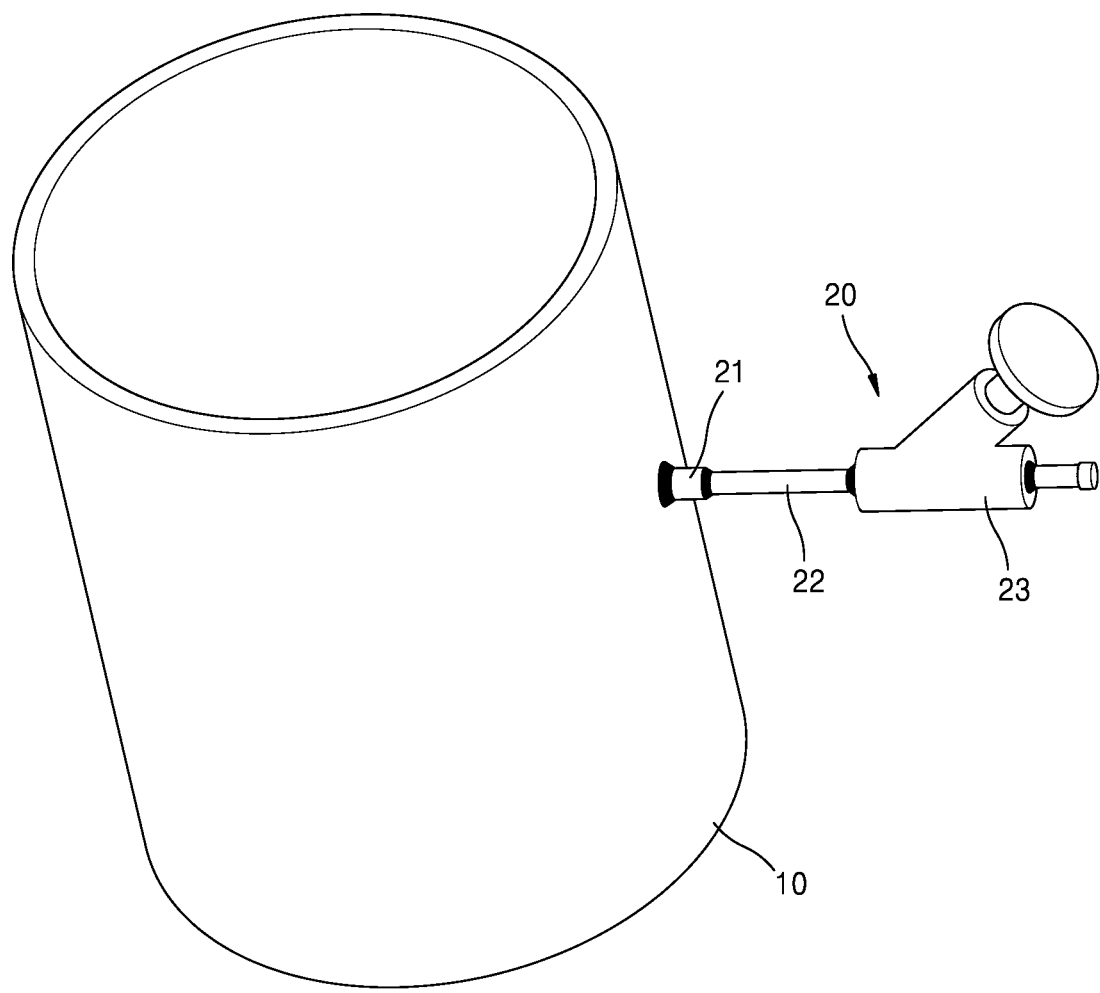
FIG. 1 is a diagram illustrating a header pipe and a branch pipe system.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure relates to a non-welded type branch piping reinforcement apparatus that may prevent damage to a branch pipe system by increasing the strength of the branch pipe system by covering and protecting the branch pipe system connected to a header pipe, by a joint clamp, a connection pipe clamp, and a valve clamp. Hereinafter, example embodiments of the present disclosure will be described in detail with reference to the accompanying drawings.

Referring to FIG. 1, a non-welded type branch piping reinforcement apparatus according to an embodiment of the present disclosure may reinforce a branch pipe system 20 connected to a header pipe 10. Particularly, the branch pipe system 20 may include a branch pipe joint 21 connected to the header pipe 10 by welding, a connection pipe 22 connecting with the branch pipe joint 21 and extending from the branch pipe joint 21, and a valve 23 connecting with the connection pipe 22 and extending from the connection pipe 22.

Figure 2:
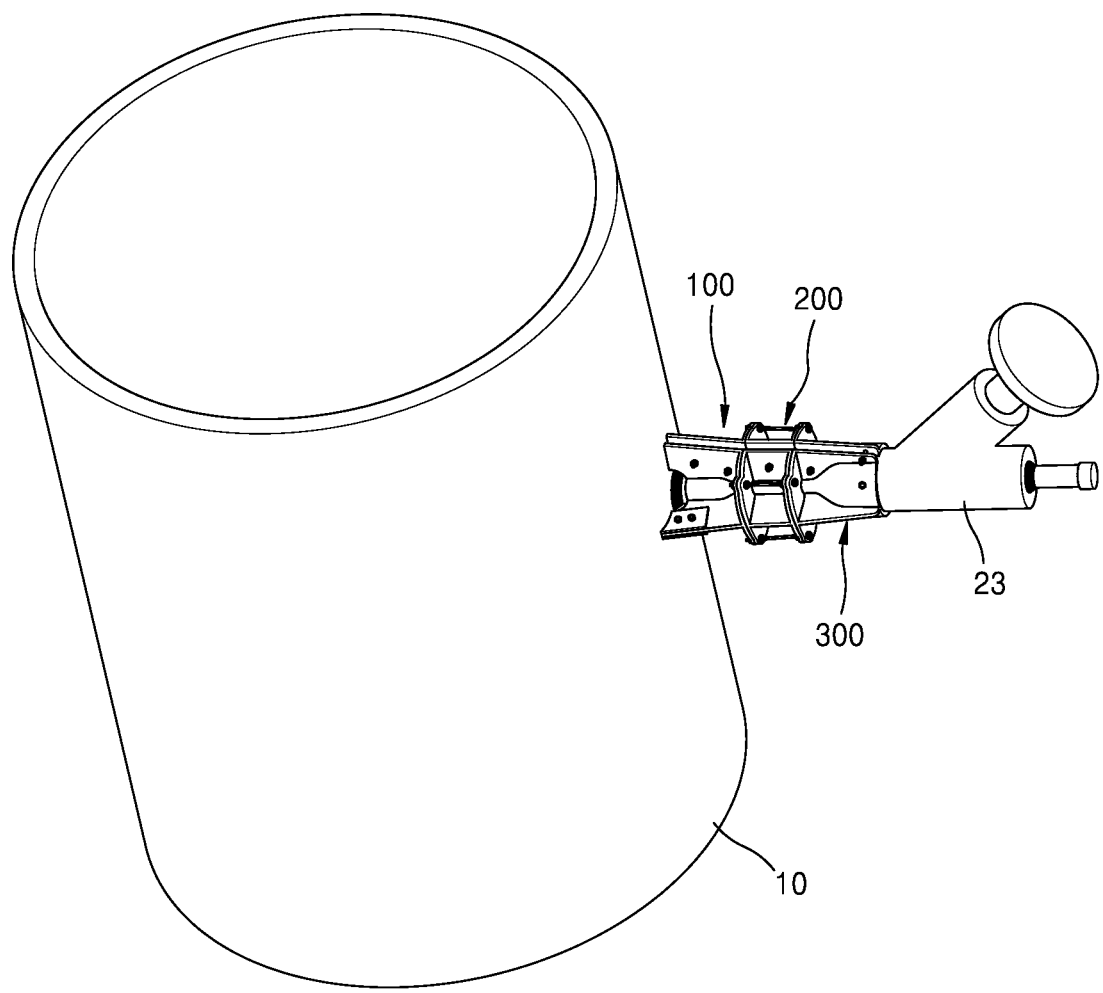
FIG. 2 is a diagram illustrating that a non-welded type branch piping reinforcement apparatus according to an embodiment of the present disclosure is installed at a branch pipe system.
Figure 3:
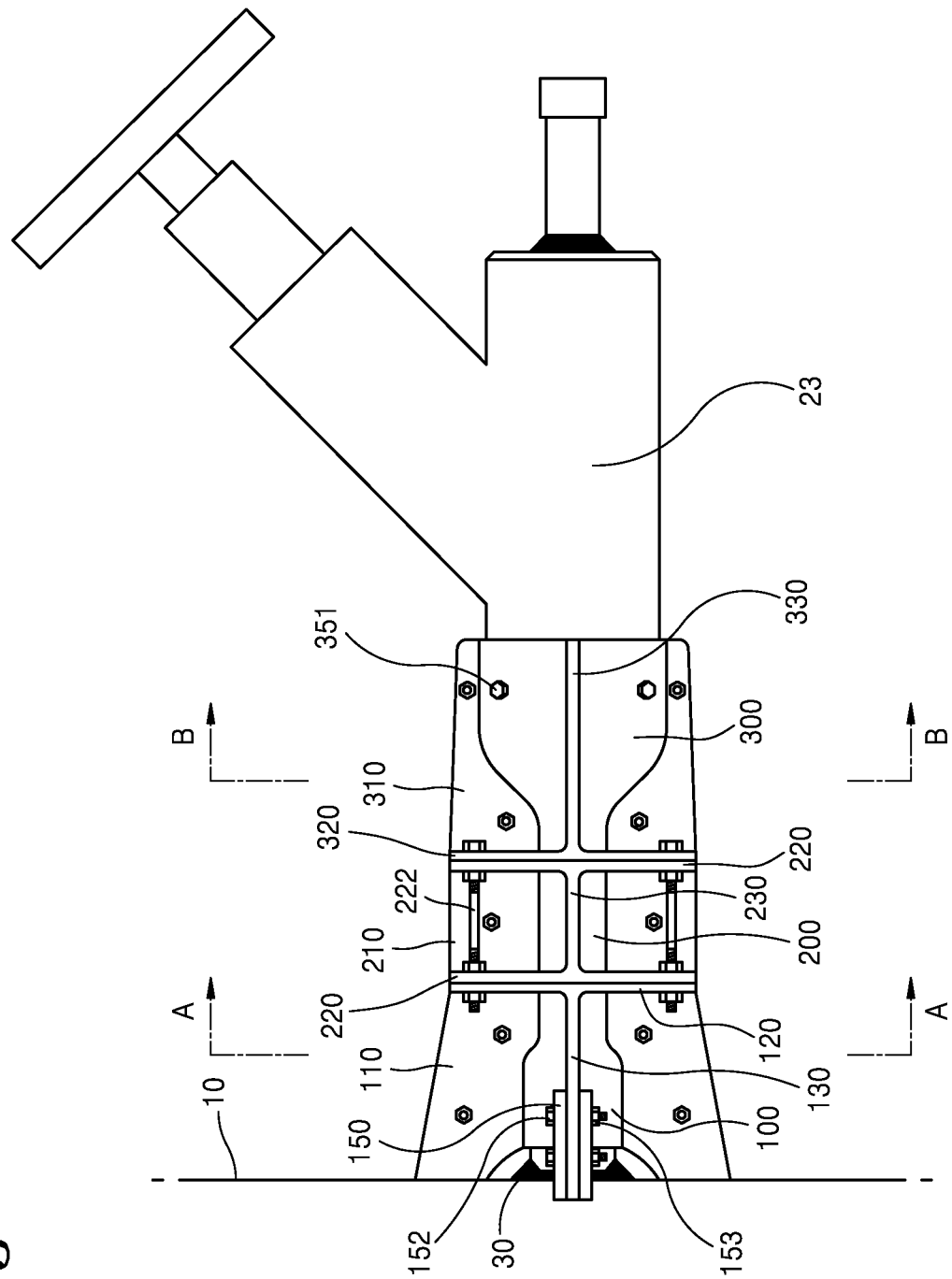
FIG. 3 is a side view taken from outside to illustrate that a non-welded type branch piping reinforcement apparatus according to an embodiment of the present disclosure is installed at a branch pipe system.
Figure 4:
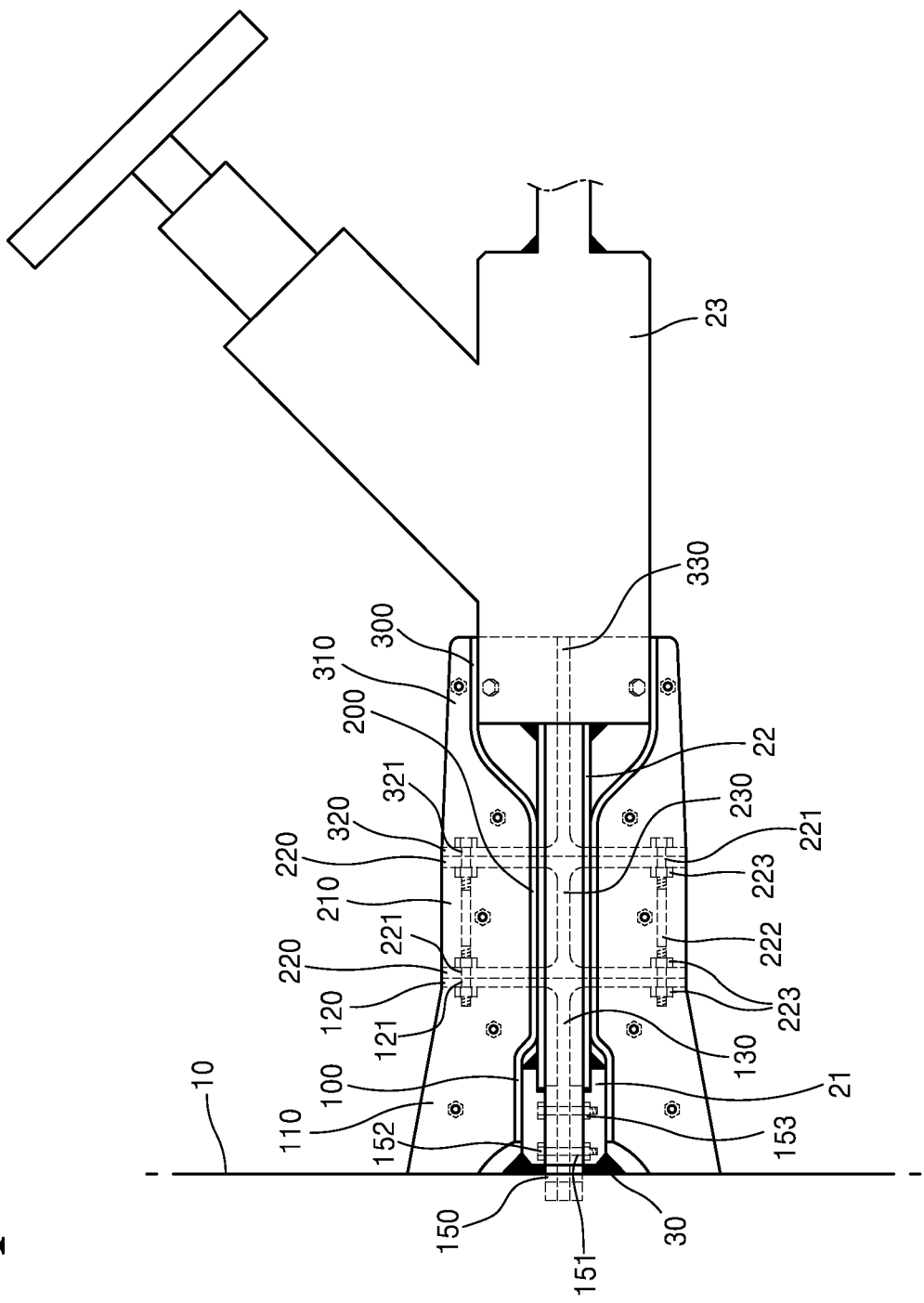
FIG. 4 is a diagram illustrating an inside of the branch pipe system in FIG. 3.

Referring to FIG. 2, the non-welded type branch piping reinforcement apparatus according to an embodiment of the present disclosure may reinforce the branch pipe system 20 while covering the branch pipe system 20 with a clamp. Referring to FIGS. 3 and 4, the non-welded type branch piping reinforcement apparatus according to an embodiment of the present disclosure may include a joint clamp 100, a connection pipe clamp 200, and a valve clamp 300.

The joint clamp 100 may be arranged to cover the branch pipe joint 21 and the connection pipe 22 and may have an arc-shaped cross section. The joint clamp 100 may cover the entire of the branch pipe joint 21 and a portion of the connection pipe 22, and the joint clamp 100 may be provided as a plurality of joint clamps 100 to cover the branch pipe joint 21 and the connection pipe 22.

Particularly, the joint clamp 100 may be provided as two joint clamps 100 having a semicircular cross section, and the two joint clamps 100 may simultaneously cover the branch pipe joint 21 and the connection pipe 22 to surround the entire circumference of the branch pipe joint 21 and the connection pipe 22. The number of joint clamps 100 may be, but is not limited to, two.

A first fastening portion 110 may be provided to connect the plurality of joint clamps 100 while surrounding the entire circumference of the branch pipe joint 21 and the connection pipe 22. The first fastening portion 110 may extend in a plate shape along the joint clamp 100 while protruding from both side ends of an arc-shape of the joint clamp 100.

Figure 5:
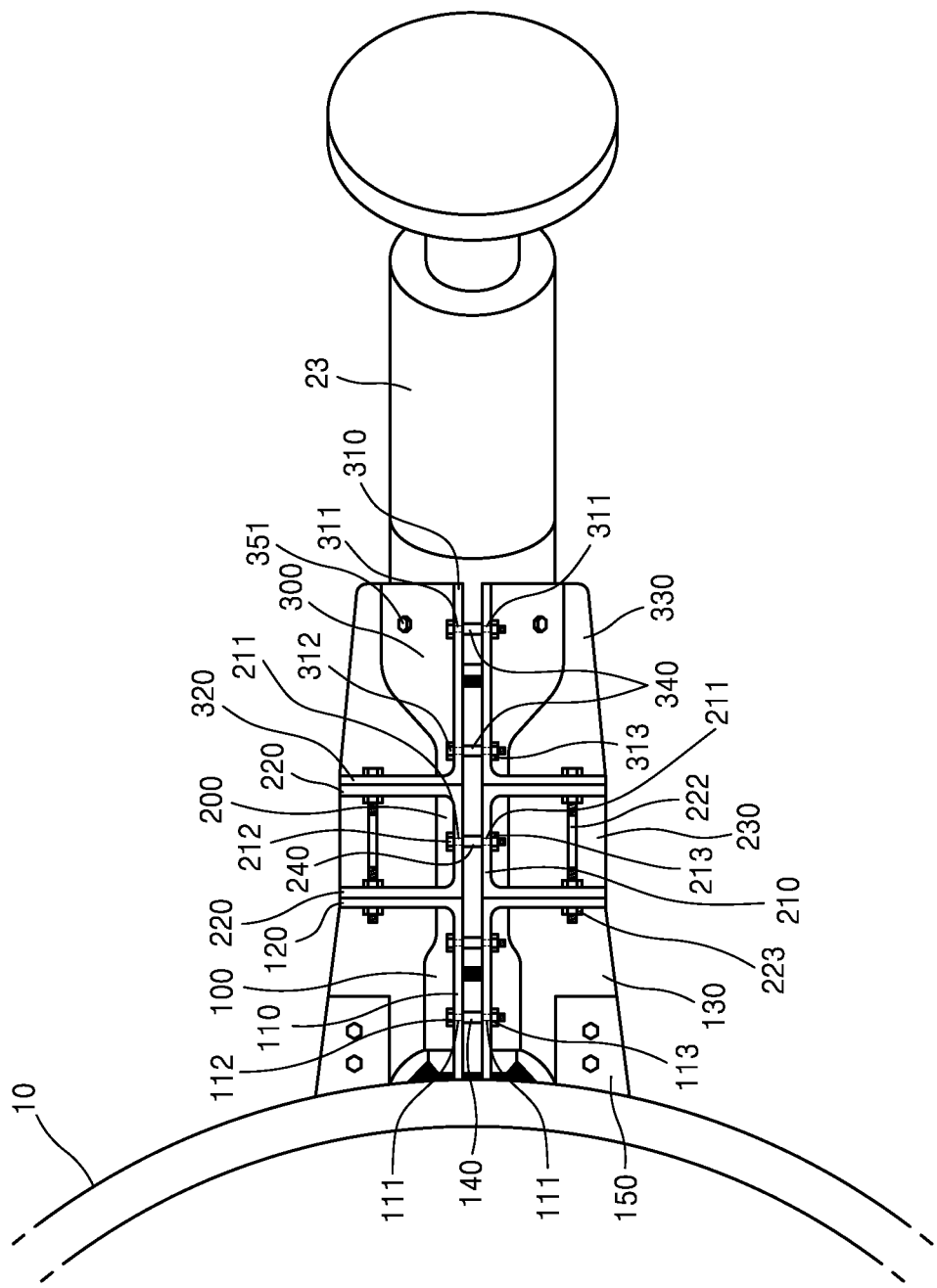
FIG. 5 is a plan view taken from outside to illustrate that a non-welded type branch piping reinforcement apparatus according to an embodiment of the present disclosure is installed at a branch pipe system.
Figure 6:
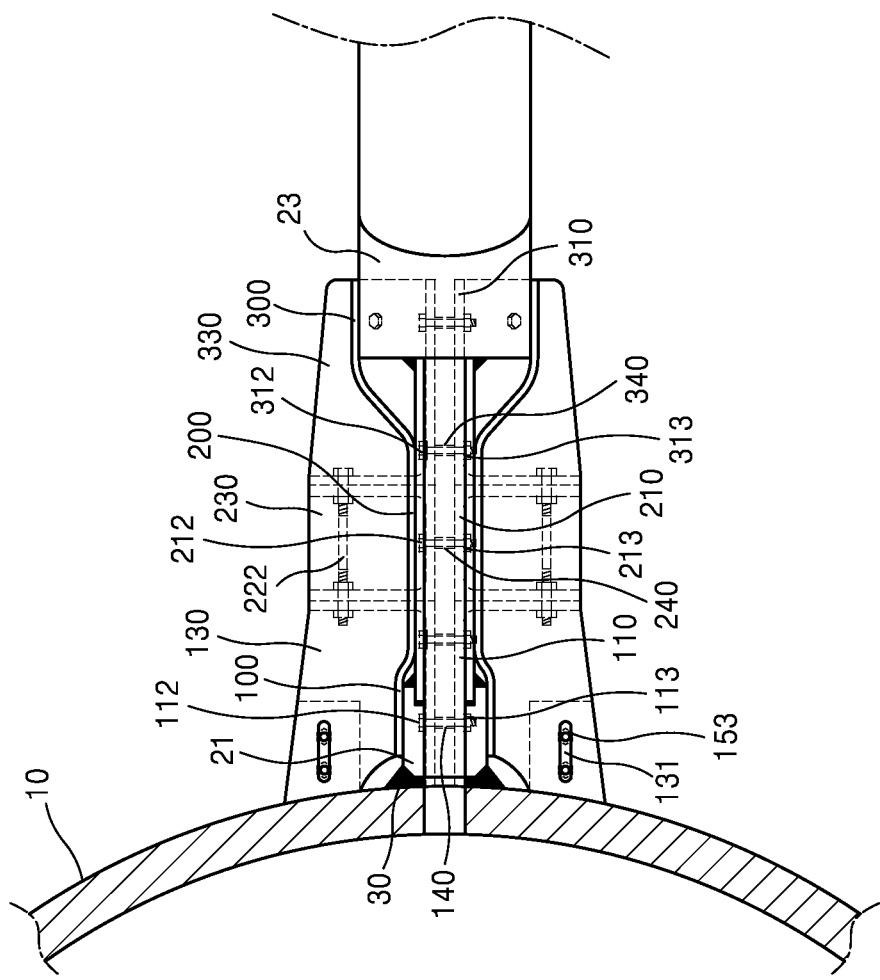
FIG. 6 is a diagram illustrating an inside of the branch pipe system in FIG. 5.

Particularly, referring to FIGS. 5 and 6, when the two joint clamps 100 are provided, the first fastening portion 110 may protrude from both side ends of a semicircular shape of the joint clamp 100, wherein both side ends of the semicircular shape may represent both side ends of the semicircular cross section (or both ends of the arc-shaped cross section).

The first fastening portion 110 may be provided with a first fastening hole 111 into which a first fastening bolt 112 is to be fitted, and the first fastening hole 111 may be provided as a plurality of first fastening holes 111 into which a plurality of first fastening bolts 112 as the first fastening bolt 112 is to be fitted. The first fastening portion 110 may be for coupling the plurality of joint clamps 100, wherein the first fastening bolt 112 may be fitted into the first fastening hole 111 of one of the joint clamps 100 and the first fastening bolt 112 may be simultaneously fitted into the first fastening hole 111 of another of the joint clamps 100 to couple the plurality of joint clamps 100. A first fastening nut 113 may be coupled to the first fastening bolt 112, and the first fastening bolt 112 may be fixedly coupled to the first fastening hole 111 through the first fastening nut 113.

As such, the plurality of joint clamps 100 may be coupled through the first fastening portion 110 to surround the entire circumference of the branch pipe joint 21 and the connection pipe 22. Referring to FIGS. 5 and 6, when the two joint clamps 100 are provided, the two joint clamps 100 may be coupled through the first fastening portion 110 and the first fastening bolt 112 at one side end of a semicircular shape of the two joint clamps 100 and the two joint clamps 100 may be coupled through the first fastening portion 110 and the first fastening bolt 112 at the other side end of a semicircular shape of the two joint clamps 100.

When the plurality of joint clamps 100 are coupled, the first fastening portion 110 of one of the joint clamps 100 and the first fastening portion 110 of another of the joint clamps 100 may be coupled with an interval therebetween as illustrated in FIGS. 5 and 6, wherein a first spacer 140 may be used to couple the plurality of joint clamps 100 while maintaining the interval between the first fastening portions 110.

The first spacer 140 may be fitted between the plurality of first fastening portions 110, wherein one side of the first spacer 140 may contact one of the first fastening portions 110 and the other side of the first spacer 140 may contact another of the first fastening portions 110 to maintain a uniform space between the first fastening portions 110.

The first spacer 140 may be formed to have a larger diameter than the first fastening hole 111, which is to prevent the first spacer 140 from being separated through the first fastening hole 111. Also, the first fastening bolt 112 may be fitted into the first spacer 140 through the first fastening hole 111 of one of the joint clamps 100 and then may pass through the first fastening hole 111 of another of the joint clamps 100 to couple the plurality of joint clamps 100.

Also, the first spacer 140 may be formed to be somewhat smaller than the required space between the first fastening portions 110. Accordingly, the first spacer 140 may be easily inserted between the first fastening portions 110. When the plurality of joint clamps 100 are finally coupled through the first fastening bolt 112, because the length of the first spacer 140 is smaller than the distance between the first fastening portions 110, the first spacer 140 may move somewhat freely.

A first stress reinforcement plate 130 may be formed at the joint clamp 100. The first stress reinforcement plate 130 may protrude from the side surface of the joint clamp 100 and extend along the joint clamp 100 to reinforce the joint clamp 100. Particularly, referring to FIGS. 3 and 4, the first stress reinforcement plate 130 may protrude and extend from the center of an arc-shaped or semicircular cross section of the joint clamp 100.

That is, the first fastening portion 110 may protrude from both side ends of the arc-shaped or semicircular cross section of the joint clamp 100, and the first stress reinforcement plate 130 may protrude from the center of the arc-shaped or semicircular cross section of the joint clamp 100 and extend along the joint clamp 100.

The first fastening portion 110 and the first stress reinforcement plate 130 may have the same outer shape of a plate shape, and the first fastening portion 110 and the first stress reinforcement plate 130 of the plate shape may protrude and extend in various directions from the joint clamp 100 to reinforce the joint clamp 100 in various directions.

Particularly, the geometrical moment of inertia may be increased through the first fastening portion 110 and the first stress reinforcement plate 130 protruding from the joint clamp 100 and thus the bending strength of the joint clamp 100 may be increased. Particularly, the bending strength of the joint clamp 100 may be increased from various angles through the first fastening portion 110 and the first stress reinforcement plate 130 protruding in various directions. Also, the polar moment of inertia may also be increased through the first fastening portion 110 and the first stress reinforcement plate 130 and thus the torsional strength of the joint clamp 100 may also be increased.

In conclusion, the bending strength and the torsional strength of the joint clamp 100 may be increased and thus the entire of the branch pipe joint 21 of the branch pipe system 20 and a portion of the connection pipe 22 may be reinforced.

The connection pipe clamp 200 may be arranged to cover the connection pipe 22 and may have an arc-shaped cross section. The connection pipe clamp 200 may cover a portion of the connection pipe 22, and the connection pipe clamp 200 may be provided as a plurality of connection pipe clamps 200 to cover the connection pipe 22. That is, the connection pipe 22 may be partially covered by the joint clamp 100 and may be partially covered by the connection pipe clamp 200. Also, the connection pipe 22 may also be partially covered by the valve clamp 300 described below.

Particularly, the connection pipe clamp 200 may be provided as two connection pipe clamps 200 having a semicircular cross section, and the two connection pipe clamps 200 may cover the connection pipe 22 to surround the entire circumference of the connection pipe 22. The number of connection pipe clamps 200 may be, but is not limited to, two.

A second fastening portion 210 may be provided to connect the plurality of connection pipe clamps 200 while surrounding the entire circumference of the connection pipe 22. The second fastening portion 210 may extend in a plate shape along the connection pipe clamp 200 while protruding from both side ends of an arc-shape of the connection pipe clamp 200.

Particularly, referring to FIGS. 5 and 6, when the two connection pipe clamps 200 are provided, the second fastening portion 210 may protrude from both side ends of a semicircular shape of the connection pipe clamp 200, wherein both side ends of the semicircular shape may represent both side ends of the semicircular cross section (or both ends of the arc-shaped cross section).

The second fastening portion 210 may be provided with a second fastening hole 211 into which a second fastening bolt 212 may be fitted, and the second fastening hole 211 may be provided as a plurality of second fastening holes 211 into which a plurality of second fastening bolts 212 as the second fastening bolt 212 may be fitted. The second fastening portion 210 may be for coupling the plurality of connection pipe clamps 200, wherein the second fastening bolt 212 may be fitted into the second fastening hole 211 of one of the connection pipe clamps 200 and the second fastening bolt 212 may be simultaneously fitted into the second fastening hole 211 of another of the connection pipe clamps 200 to couple the plurality of connection pipe clamps 200. A second fastening nut 213 may be coupled to the second fastening bolt 212, and the second fastening bolt 212 may be fixedly coupled to the second fastening hole 211 through the second fastening nut 213.

As such, the plurality of connection pipe clamps 200 may be coupled through the second fastening portion 210 to surround the entire circumference of the connection pipe 22. Referring to FIGS. 5 and 6, when the two connection pipe clamps 200 are provided, the two connection pipe clamps 200 may be coupled through the second fastening portion 210 and the second fastening bolt 212 at one side end of a semicircular shape of the two connection pipe clamps 200 and the two connection pipe clamps 200 may be coupled through the second fastening portion 210 and the second fastening bolt 212 at the other side end of a semicircular shape of the two connection pipe clamps 200.

When the plurality of connection pipe clamps 200 are coupled, the second fastening portion 210 of one of the connection pipe clamps 200 and the second fastening portion 210 of another of the connection pipe clamps 200 may be coupled with an interval therebetween as illustrated in FIGS. 5 and 6, wherein a second spacer 240 may be used to couple the plurality of connection pipe clamps 200 while maintaining the interval between the second fastening portions 210.

The second spacer 240 may be fitted between the plurality of second fastening portions 210, wherein one side of the second spacer 240 may contact one of the second fastening portions 210 and the other side of the second spacer 240 may contact another of the second fastening portions 210 to maintain a uniform space between the second fastening portions 210.

The second spacer 240 may be formed to have a larger diameter than the second fastening hole 211, which is to prevent the second spacer 240 from being separated through the second fastening hole 211. Also, the second fastening bolt 212 may be fitted into the second spacer 240 through the second fastening hole 211 of one of the connection pipe clamps 200 and then may pass through the second fastening hole 211 of another of the connection pipe clamps 200 to couple the plurality of connection pipe clamps 200.

Also, the second spacer 240 may be formed to be somewhat smaller than the required space between the second fastening portions 210. Accordingly, the second spacer 240 may be easily inserted between the second fastening portions 210. When the plurality of connection pipe clamps 200 are finally coupled through the second fastening bolt 212, because the length of the second spacer 240 is smaller than the distance between the second fastening portions 210, the second spacer 240 may move somewhat freely.

A second stress reinforcement plate 230 may be formed at the connection pipe clamp 200. The second stress reinforcement plate 230 may protrude from the side surface of the connection pipe clamp 200 and extend along the connection pipe clamp 200 to reinforce the connection pipe clamp 200. Particularly, referring to FIGS. 3 and 4, the second stress reinforcement plate 230 may protrude and extend from the center of an arc-shaped or semicircular cross section of the connection pipe clamp 200.

That is, the second fastening portion 210 may protrude from both side ends of the arc-shaped or semicircular cross section of the connection pipe clamp 200, and the second stress reinforcement plate 230 may protrude from the center of the arc-shaped or semicircular cross section of the connection pipe clamp 200 and extend along the connection pipe clamp 200.

The second fastening portion 210 and the second stress reinforcement plate 230 may have the same outer shape of a plate shape, and the second fastening portion 210 and the second stress reinforcement plate 230 of the plate shape may protrude and extend in various directions from the connection pipe clamp 200 to reinforce the connection pipe clamp 100 in various directions.

Particularly, the geometrical moment of inertia may be increased through the second fastening portion 210 and the second stress reinforcement plate 230 protruding from the connection pipe clamp 200 and thus the bending strength of the connection pipe clamp 200 may be increased. Particularly, the bending strength of the connection pipe clamp 200 may be increased from various angles through the second fastening portion 210 and the second stress reinforcement plate 230 protruding in various directions. Also, the polar moment of inertia may also be increased through the second fastening portion 210 and the second stress reinforcement plate 230 and thus the torsional strength of the connection pipe clamp 200 may also be increased.

In conclusion, the bending strength and the torsional strength of the connection pipe clamp 200 may be increased and thus a portion of the connection pipe 22 of the branch pipe system 20 may be reinforced.

The valve clamp 300 may be arranged to cover the connection pipe 22 and the valve 23 and may have an arc-shaped cross section. The valve clamp 300 may cover a portion of the connection pipe 22 and the valve 23, and the valve clamp 300 may be provided as a plurality of valve clamps 300 to cover the connection pipe 22 and the valve 23.

Particularly, the valve clamp 300 may be provided as two valve clamps 300 having a semicircular cross section, and the two valve clamps 300 may simultaneously cover the connection pipe 22 and the valve 23 to surround the entire circumference of the connection pipe 22 and the valve 23. The number of valve clamps 300 may be, but is not limited to, two.

A third fastening portion 310 may be provided to connect the plurality of valve clamps 300 while surrounding the entire circumference of the connection pipe 22 and the valve 23. The third fastening portion 310 may extend in a plate shape along the valve clamp 300 while protruding from both side ends of an arc-shape of the valve clamp 300.

Particularly, referring to FIGS. 5 and 6, when the two valve clamps 300 are provided, the third fastening portion 310 may protrude from both side ends of a semicircular shape of the valve clamp 300, wherein both side ends of the semicircular shape may represent both side ends of the semicircular cross section (or both ends of the arc-shaped cross section).

The third fastening portion 310 may be provided with a third fastening hole 311 into which a third fastening bolt 312 may be fitted, and the third fastening hole 311 may be provided as a plurality of third fastening holes 311 into which a plurality of third fastening bolts 312 as the third fastening bolt 312 may be fitted. The third fastening portion 310 may be for coupling the plurality of valve clamps 300, wherein the third fastening bolt 312 may be fitted into the third fastening hole 311 of one of the valve clamps 300 and the third fastening bolt 312 may be simultaneously fitted into the third fastening hole 311 of another of the valve clamps 300 to couple the plurality of valve clamps 300. A third fastening nut 313 may be coupled to the third fastening bolt 312, and the third fastening bolt 312 may be fixedly coupled to the third fastening hole 311 through the third fastening nut 313.

As such, the plurality of valve clamps 300 may be coupled through the third fastening portion 310 to surround the entire circumference of the connection pipe 22 and the valve 23. Referring to FIGS. 5 and 6, when the two valve clamps 300 are provided, the two valve clamps 300 may be coupled through the third fastening portion 310 and the third fastening bolt 312 at one side end of a semicircular shape of the two valve clamps 300 and the two valve clamps 300 may be coupled through the third fastening portion 310 and the third fastening bolt 312 at the other side end of a semicircular shape of the two valve clamps 300.

When the plurality of valve clamps 300 are coupled, the third fastening portion 310 of one of the valve clamps 300 and the third fastening portion 310 of another of the valve clamps 300 may be coupled with an interval therebetween as illustrated in FIGS. 5 and 6, wherein a third spacer 340 may be used to couple the plurality of valve clamps 300 while maintaining the interval between the third fastening portions 310.

The third spacer 340 may be fitted between the plurality of third fastening portions 310, wherein one side of the third spacer 340 may contact one of the third fastening portions 310 and the other side of the third spacer 340 may contact another of the third fastening portions 310 to maintain a uniform space between the third fastening portions 310.

The third spacer 340 may be formed to have a larger diameter than the third fastening hole 311, which is to prevent the third spacer 340 from being separated through the third fastening hole 311. Also, the third fastening bolt 312 may be fitted into the third spacer 340 through the third fastening hole 311 of one of the valve clamps 300 and then may pass through the third fastening hole 311 of another of the valve clamps 300 to couple the plurality of valve clamps 300.

Also, the third spacer 340 may be formed to be somewhat smaller than the required space between the third fastening portions 310. Accordingly, the third spacer 340 may be easily inserted between the third fastening portions 310. When the plurality of valve clamps 300 are finally coupled through the third fastening bolt 312, because the length of the third spacer 340 is smaller than the distance between the third fastening portions 310, the third spacer 340 may move somewhat freely.

A third stress reinforcement plate 330 may be formed at the valve clamp 300. The third stress reinforcement plate 330 may protrude from the side surface of the valve clamp 300 and extend along the valve clamp 300 to reinforce the valve clamp 300. Particularly, referring to FIGS. 3 and 4, the third stress reinforcement plate 330 may protrude and extend from the center of an arc-shaped or semicircular cross section of the valve clamp 300.

That is, the third fastening portion 310 may protrude from both side ends of the arc-shaped or semicircular cross section of the valve clamp 300, and the third stress reinforcement plate 330 may protrude from the center of the arc-shaped or semicircular cross section of the valve clamp 300 and extend along the valve clamp 300.

The third fastening portion 310 and the third stress reinforcement plate 330 may have the same outer shape of a plate shape, and the third fastening portion 310 and the third stress reinforcement plate 330 of the plate shape may protrude and extend in various directions from the valve clamp 300 to reinforce the valve clamp 300 in various directions.

Particularly, the geometrical moment of inertia may be increased through the third fastening portion 310 and the third stress reinforcement plate 330 protruding from the valve clamp 300 and thus the bending strength of the valve clamp 300 may be increased. Particularly, the bending strength of the valve clamp 300 may be increased from various angles through the third fastening portion 310 and the third stress reinforcement plate 330 protruding in various directions. Also, the polar moment of inertia may also be increased through the third fastening portion 310 and the third stress reinforcement plate 330 and thus the torsional strength of the valve clamp 300 may also be increased.

In conclusion, the bending strength and the torsional strength of the valve clamp 300 may be increased and thus a portion of the connection pipe 22 of the branch pipe system 20 and the valve 23 may be reinforced.

The joint clamp 100, the connection pipe clamp 200, and the valve clamp 300 described above may be connected and coupled to each other through a first connection plate 120, a second connection plate 220, and a third connection plate 320. Because the joint clamp 100, the connection pipe clamp 200, and the valve clamp 300 are connected and coupled to each other, they may operate integrally when a load is applied thereto.

Figure 7:
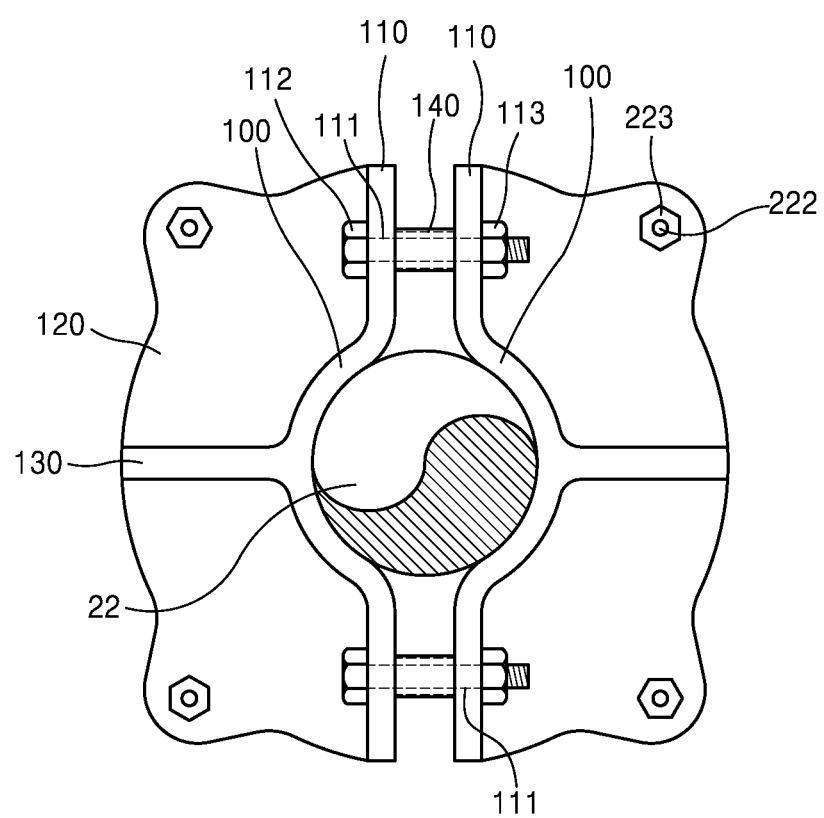
FIG. 7 is a cross-sectional view taken along a line A-A of FIG. 3.

Referring to FIGS. 3, 4, and 7, the first connection plate 120 may be provided at the other end of the joint clamp 100, may extend in a direction across the extension direction of the connection pipe 22, may have a first connection hole 121 formed therein, and may have a plate shape. Here, the other end of the joint clamp 100 may be a point where the joint clamp 100 is connected to the connection pipe clamp 200. The first connection plate 120 may have a fan-shaped cross section, may form a plane intersecting the extension direction of the connection pipe 22, for example, a perpendicular plane, and may extend in a plate shape while forming a perpendicular plane with respect to the first fastening portion 110 and the first stress reinforcement plate 130.

The second connection plate 220 may be provided at each of one end and the other end of the connection pipe clamp 200, may extend in a direction across the extension direction of the connection pipe 22, may have a second connection hole 221 formed therein, and may have a plate shape. Here, one end of the connection pipe clamp 200 may be a point that is connected to the joint clamp 100, the other end of the connection pipe clamp 200 may be a point that is connected to the valve clamp 300.

That is, the second connection plate 220 may be provided at each of one end and the other end of the connection pipe clamp 200 to connect the joint clamp 100 to the connection pipe clamp 200 and connect the connection pipe clamp 200 to the valve clamp 300. The second connection plate 220 may have a fan-shaped cross section, may form a plane intersecting the extension direction of the connection pipe 22, for example, a perpendicular plane, and may extend in a plate shape while forming a perpendicular plane with respect to the second fastening portion 210 and the second stress reinforcement plate 230.

The third connection plate 320 may be provided at one end of the valve clamp 300, may extend in a direction across the extension direction of the connection pipe 22, may have a third connection hole 321 formed therein, and may have a plate shape. Here, the one end of the valve clamp 300 may be a point where the valve clamp 300 is connected to the connection pipe clamp 200. The third connection plate 320 may have a fan-shaped cross section, may form a plane intersecting the extension direction of the connection pipe 22, for example, a perpendicular plane, and may extend in a plate shape while forming a perpendicular plane with respect to the third fastening portion 310 and the third stress reinforcement plate 330.

Particularly, the joint clamp 100, the connection pipe clamp 200, and the valve clamp 300 may be connected and coupled through the first connection plate 120, the second connection plate 220, and the third connection plate 320 as follows. Referring to FIGS. 4, 5, and 7, the first connection hole 121 and the second connection hole 221 may be arranged to communicate with each other, and the first connection plate 120 and the second connection plate 220 may be made to contact each other. When the first connection plate 120 and the second connection plate 220 contact each other, a connection bolt 222 may be simultaneously inserted into the first connection hole 121 and the second connection hole 221 to couple the first connection plate 120 to the second connection plate 220.

A plurality of first connection holes 121 and a plurality of second connection holes 221 may be provided, and a plurality of connection bolts 222 may be used. Also, a connection nut 223 may be used to prevent the connection bolt 222 from being separated from the first connection hole 121 and the second connection hole 221.

The same method as above may also be applied to connect the second connection plate 220 to the third connection plate 320; that is, the second connection hole 221 and the third connection hole 321 may be arranged to communicate with each other, the second connection plate 220 and the third connection plate 320 may be made to contact each other, and the connection bolt 222 and the connection nut 223 may be used to couple the second connection plate 220 to the third connection plate 320.

A plurality of second connection holes 221 and a plurality of third connection holes 321 may be provided, and a plurality of connection bolts 222 may be used. Also, the connection bolt 222 may simultaneously pass through the first connection hole 121, the second connection hole 221, and the third connection hole 321 to connect the first connection plate 120, the second connection plate 220, and the third connection plate 320 at one time.

As such, when the joint clamp 100, the connection pipe clamp 200, and the valve clamp 300 are connected and coupled through the first connection plate 120, the second connection plate 220, and the third connection plate 320, the joint clamp 100, the connection pipe clamp 200, and the valve clamp 300 may be integrally connected to each other.

Particularly, when a load is applied to the branch pipe joint 21, the load of the branch pipe joint 21 may be transmitted to the joint clamp 100 and the load transmitted to the joint clamp 100 may be distributed to the connection pipe clamp 200 through the first connection plate 120 and the second connection plate 220. The load distributed to the connection pipe clamp 200 may be again distributed to the valve clamp 300 through the second connection plate 220 and the third connection plate 320.

Through this process, the loads applied to the branch pipe joint 21, the connection pipe 22, and the valve 23 of the branch pipe system 20 may be distributed to the joint clamp 100, the connection pipe clamp 200, and the valve clamp 300, thus reinforcing the branch pipe system 20.

The joint clamp 100 and the connection pipe clamp 200 may be integrally manufactured, and the connection pipe clamp 200 and the valve clamp 300 may also be integrally manufactured. Because the connection pipe clamp 200 is integrally manufactured with the joint clamp 100 or is integrally manufactured with the valve clamp 300, the connection pipe clamp 200 may not be separately manufactured and in this case, only the joint clamp 100 and the valve clamp 300 may be connected and used.

Figure 8:
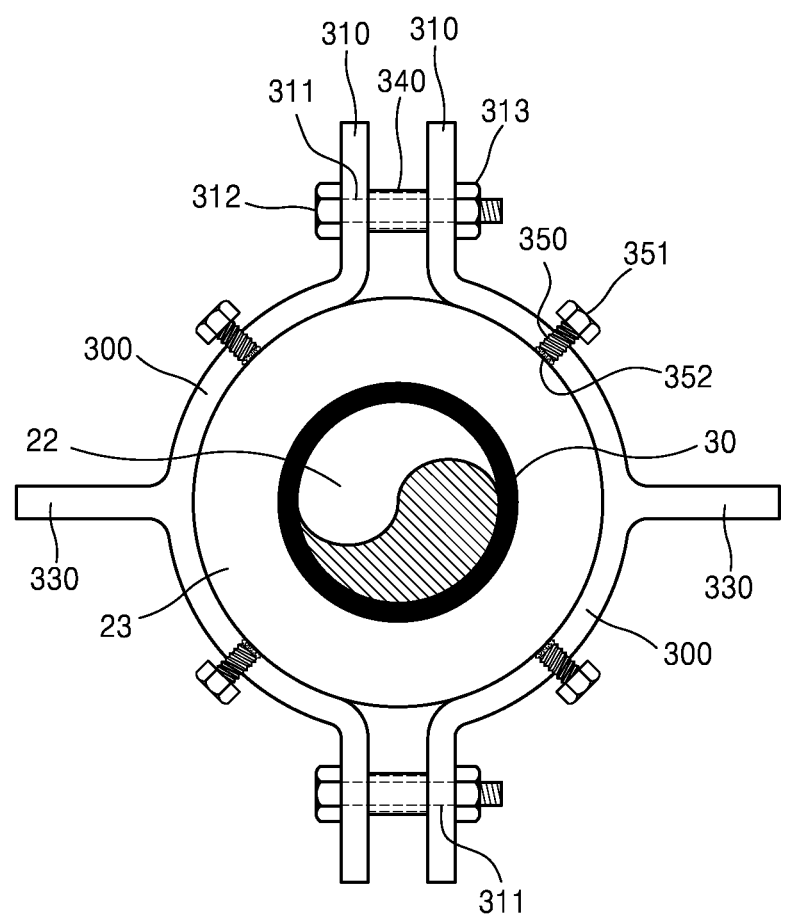
FIG. 8 is a cross-sectional view taken along a line B-B of FIG. 3.
Figure 9:
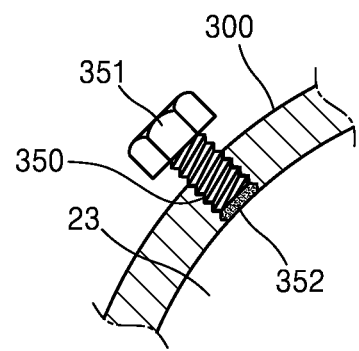
FIG. 9 is an enlarged view of a bolt hole and a fixing bolt of FIG. 8.

Referring to FIGS. 8 and 9, a plurality of bolt holes 350 to which a plurality of fixing bolts 351 are to be fastened along the circumference of the valve clamp 300 may be formed at the side surface of the valve clamp 300, and the fixing bolt 351 may be fastened to the bolt hole 350 while contacting the surface of the valve 23, wherein a friction filler 352 may be fitted between the surface of the valve 23 and the fixing bolt 351.

The fixing bolt 351 may fix the valve clamp 300 to the valve 23 through a frictional force while contacting the surface of the valve 23, and the friction filler 352 may be inserted between the surface of the valve 23 and the fixing bolt 351 to increase the friction force. The friction filler 352 may include a material that may be plastically deformed and has a large frictional coefficient, and may be located between the surface of the valve 23 and the fixing bolt 351 to increase the frictional force, as illustrated in FIG. 9.

As illustrated in FIG. 8, when the plurality of valve clamps 300 surround the valve 23, the bolt holes 350 may be formed at equal angles around the valve 23. When two valve clamps 300 are provided, two bolt holes 350 may be formed at each of the valve clamps 300 and a total of four bolt holes 350 may be formed to fix the valve clamps 300 to the valve 23.

Referring to FIGS. 5 and 6, one end of the first fastening portion 110 of the joint clamp 100 and one end of the first stress reinforcement plate 130 may contact the header pipe 10. That is, one end of the first fastening portion 110 and one end of the first stress reinforcement plate 130 may be fabricated to surface-contact the header pipe 10, and according to the surface contact with the header pipe 10 as such, when the bending moment caused by the vibration and load is applied to the branch pipe system 20, the first fastening portion 110 and the first stress reinforcement plate 130 may support the branch pipe system 20 to increase the bending strength of the branch pipe system 20.

For this, one end of the first stress reinforcement plate 130 may have a curved surface formed corresponding to the curvature of the header pipe 10, and one end of the first fastening portion 110 may have a curved surface formed corresponding to the curvature of the header pipe 10.

Referring to FIGS. 3, 4, 6, and 10, a stiffener 150 may be coupled to the first stress reinforcement plate 130. The stiffener 150 may reinforce the first stress reinforcement plate 130 and may increase the contact area between the header pipe 10 and the first stress reinforcement plate 130. The stiffener 150 may be provided at one end of the first stress reinforcement plate 130, that is, a point where the first stress reinforcement plate 130 and the header pipe 10 contact each other, and may have a plate shape.

In order to be coupled to the first stress reinforcement plate 130 through an adjustment bolt 152, the stiffener 150 may be provided with a plurality of insertion holes 151 into which the adjustment bolt 152 is to be inserted. The adjustment bolt 152 may be coupled through an adjustment nut 153 or the like. Also, in order to contact the header pipe 10, one end of the stiffener 150 may have a curved surface formed corresponding to the curvature of the header pipe 10. That is, as the plate-shaped stiffener 150 one end of which has a curved surface formed corresponding to the header pipe 10 is coupled to the first stress reinforcement plate 130, the contact area between the header pipe 10 and the first stress reinforcement plate 130 may be increased and thus the bending strength of the branch pipe system 20 may be increased.

Figure 10:
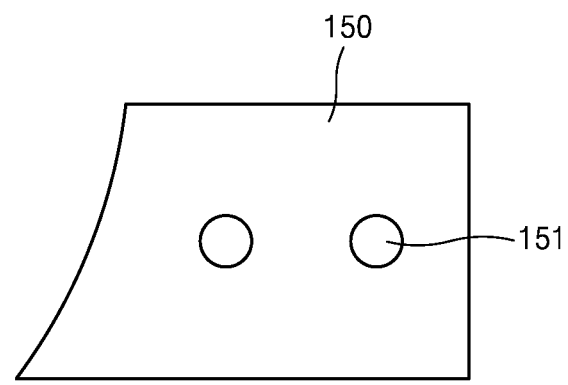
FIG. 10 is a diagram illustrating a stiffener and a first stress reinforcement plate according to an embodiment of the present disclosure.
Figure 10:
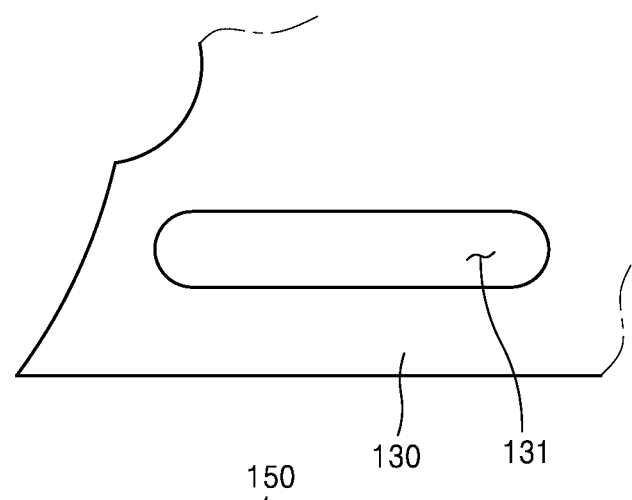
Figure 10:
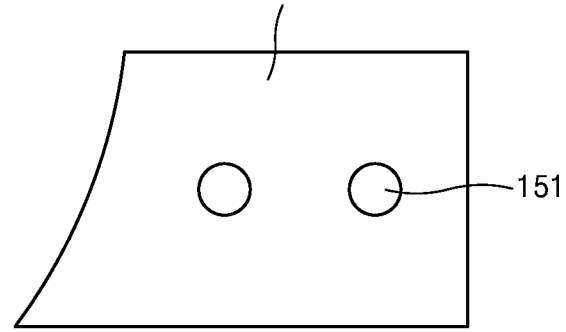

In order to couple the stiffener 150 to the first stress reinforcement plate 130, the first stress reinforcement plate 130 may be provided with a groove 131 that is larger than the diameter of the adjustment bolt 152 and extends in the transverse direction. As illustrated in FIG. 10, because the groove 131 formed at the first stress reinforcement plate 130 is larger than the diameter of the adjustment bolt 152 and extends in the transverse direction, the position of the stiffener 150 may be freely adjusted before the adjustment bolt 152 is fixed by the adjustment nut 153.

As such, one end of the stiffener 150 may be made to accurately contact the header pipe 10 through the groove 131 of the first stress reinforcement plate 130, and the stiffener 150 may be fixed to the first stress reinforcement plate 130 through the adjustment bolt 152 after one end of the stiffener 150 accurately contacts the header pipe 10.

The non-welded branch piping reinforcement apparatus according to embodiments of the present disclosure described above may have the following effects.

The non-welded type branch piping reinforcement apparatus according to the embodiments of the present disclosure may cover and protect the branch pipe system 20 through the joint clamp 100, the connection pipe clamp 200, and the valve clamp 300 to distribute the vibration and load occurring at the branch pipe system 20, thereby uniformizing the stress distribution while reducing the stress applied to the branch pipe system 20.

Particularly, because the joint clamp 100, the connection pipe clamp 200, and the valve clamp 300 are coupled through the first connection plate 120, the second connection plate 220, and the third connection plate 320, they may behave integrally in the event of a vibration and load and thus the vibration and load occurring at the branch pipe system 20 may be distributed to the joint clamp 100, the connection pipe clamp 200, and the valve clamp 300.

Also, the geometrical moment of inertia and the polar moment of inertia may be increased through the first fastening portion 110, the first stress reinforcement plate 130, the second fastening portion 210, the second stress reinforcement plate 230, the third fastening portion 310, the third stress reinforcement plate 330, and/or the like and thus the bending strength and torsional strength may be increased.

In addition, because the non-welded type branch piping reinforcement apparatus according to the embodiments of the present disclosure may cover only the branch pipe system 20 itself through the joint clamp 100, the connection pipe clamp 200, and the valve clamp 300, it may be installed regardless of the conditions of the header pipe 10 and may reinforce the branch pipe system 20 through only clamp fastening without welding to the header pipe and the branch pipe system.

As the non-welded type branch piping reinforcement apparatus according to the embodiments of the present disclosure is installed at the branch pipe system 20, the weight of the branch pipe system 20 may increase and thus a welding portion 30 between the header pipe 10 and the branch pipe joint 21 may become vulnerable; however, the header pipe 10 and the branch pipe joint 21 may have a high welding strength because a full penetration weld is applied thereto.

Also, the bending strength of the branch pipe system 20 may be greatly increased also through the first stress reinforcement plate 130 and the first fastening portion 110 that has a curved surface formed corresponding to the curvature of the header pipe 10 and contacts the header pipe 10, and thus the welding portion 30 may not become vulnerable even in the case of using the non-welded type branch piping reinforcement apparatus according to the embodiments of the present disclosure.

Also, in the power plant practice of the related art, a pipe stress analysis is performed and the soundness are verified by considering, at the design stage, the pipe weight, the thermal expansion load, the earthquake load, the fluid dynamic load, and/or the like occurring in the branch pipe system; however, because the vibration load during the operation of the header pipe and the branch pipe system is difficult to accurately predict at the design stage, the impact of the vibration during the commissioning is observed and evaluated to verify the soundness thereof.

Because the non-welded type branch piping reinforcement apparatus according to the embodiments of the present disclosure may a great effect of also accommodating the vibration load and other loads considered at the design stage, the use of the non-welded branch piping reinforcement apparatus according to the embodiments of the present disclosure from the design state may highly improve the soundness of branch pipe system.

The non-welded branch piping reinforcement apparatus according to the embodiments of the present disclosure described above may be modified and used as follows. The first stress reinforcement plate 130, the second stress reinforcement plate 230, and the third stress reinforcement plate 330 may be provided in plurality. Also, when the connection pipe 22 is not straight-line-shaped but L-shaped, the connection pipe clamp 200 may be formed in a shape corresponding to the shape of the connection pipe 22.

The non-welded type branch piping reinforcement apparatus of the present disclosure may cover and protect the branch pipe system connected to the header pipe, by the joint clamp, the connection pipe clamp, and the valve clamp and may reinforce the branch pipe joint, the connection pipe, and the valve having different diameters and strengths to have a uniform strength by connecting the joint clamp, the connection pipe clamp, and the valve clamp to each other to be integrally used, thus reducing the stress of the branch pipe system and uniformizing the stress distribution thereof in the event of a vibration in the branch pipe system.

Also, the non-welded type branch piping reinforcement apparatus of the present disclosure may be installed regardless of the conditions of the header pipe because it covers only the branch pipe system itself through the joint clamp, the connection pipe clamp, and the valve clamp, and may reinforce the branch pipe system through only clamp fastening without welding to the header pipe and the branch pipe system.

Also, the non-welded type branch piping reinforcement apparatus of the present disclosure may prevent damage to the branch pipe system while covering the branch pipe system through the joint clamp, the connection pipe clamp, and the valve clamp, and may accommodate the vibration load and other loads than the vibration load.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A non-welded type branch piping reinforcement apparatus for reinforcing a branch pipe system including a branch pipe joint connected to a header pipe, a connection pipe connected to the branch pipe joint, and a valve connected to the connection pipe,
   the non-welded type branch piping reinforcement apparatus comprising:
   a joint clamp arranged to cover the branch pipe joint and the connection pipe and having an arc-shaped cross section;
   a connection pipe clamp arranged to cover the connection pipe and having an arc-shaped cross section; and
   a valve clamp arranged to cover the connection pipe and the valve and having an arc-shaped cross section,
   wherein one end of the connection pipe clamp is connected to the joint clamp and the other end of the connection pipe clamp is connected to the valve clamp,
   wherein the joint clamp is provided in plurality to cover the branch pipe joint and the connection pipe, the connection pipe clamp is provided in plurality to cover the connection pipe, and the valve clamp is provided in plurality to cover the connection pipe and the valve,
   wherein a first fastening portion extending in a plate shape along the joint clamp while protruding from both side ends of an arc-shape of the joint clamp and provided with a first fastening hole into which a first fastening bolt is to be fitted,
   wherein a second fastening portion extending in a plate shape along the connection pipe clamp while protruding from both side ends of an arc-shape of the connection pipe clamp and provided with a second fastening hole into which a second fastening bolt is to be fitted; and a third fastening portion extending in a plate shape along the valve clamp while protruding from both side ends of an arc-shape of the valve clamp and provided with a third fastening hole into which a third fastening bolt is to be fitted,
   wherein a first spacer formed to have a larger diameter than the first fastening hole and fitted between a plurality of first fastening portions,
   wherein a second spacer formed to have a larger diameter than the second fastening hole and fitted between a plurality of second fastening portions; and a third spacer formed to have a larger diameter than the third fastening hole and fitted between a plurality of third fastening portions.

2. The non-welded type branch piping reinforcement apparatus of claim 1, wherein
   one end and the other end of the connection pipe clamp are provided with a plate-shaped second connection plate having a second connection hole formed therein while extending in a direction across an extension direction of the connection pipe,
   the other end of the joint clamp is provided with a plate-shaped first connection plate having a first connection hole formed therein while extending in a direction across an extension direction of the connection pipe, and
   one end of the valve clamp is provided with a plate-shaped third connection plate having a third connection hole formed therein while extending in a direction across an extension direction of the connection pipe.

3. The non-welded type branch piping reinforcement apparatus of claim 1, further comprising:
   a plate-shaped first stress reinforcement plate protruding from a side surface of the joint clamp and extending along the joint clamp;
   a plate-shaped second stress reinforcement plate protruding from a side surface of the connection pipe clamp and extending along the connection pipe clamp; and
   a plate-shaped third stress reinforcement plate protruding from a side surface of the valve clamp and extending along the valve clamp.

4. The non-welded type branch piping reinforcement apparatus of claim 3, further comprising:
   a stiffener formed in a plate shape, coupled to the first stress reinforcement plate, and provided with an insertion hole into which an adjustment bolt is to be inserted,
   wherein the first stress reinforcement plate is provided with a groove that is larger than a diameter of the adjustment bolt and extends in a transverse direction and one end of the stiffener contacts the header pipe while having a curved surface formed corresponding to the curvature of the header pipe.

5. The non-welded type branch piping reinforcement apparatus of claim 1, wherein
   the joint clamp and the connection pipe clamp are integrally manufactured or the connection pipe clamp and the valve clamp are integrally manufactured.

6. The non-welded type branch piping reinforcement apparatus of claim 1, wherein one end of the first stress reinforcement plate contacts the header pipe while having a curved surface formed corresponding to the curvature of the header pipe, and one end of the first fastening portion contacts the header pipe while having a curved surface formed corresponding to the curvature of the header pipe.

7. The non-welded type branch piping reinforcement apparatus of claim 1, wherein a plurality of bolt holes into which a fixing bolt is to be fastened are formed at a side surface of the valve clamp along a circumference of the valve clamp, and the fixing bolt is fastened into the bolt hole to contact a surface of the valve, wherein a friction filler is fitted between the fixing bolt and the surface of the valve.

* * * * *